(12) United States Patent
Hodroj

(10) Patent No.: US 11,627,466 B2
(45) Date of Patent: Apr. 11, 2023

(54) UPDATING AUTOMATIC ACCESS PARAMETERS FOR WIRELESS LOCAL AREA NETWORKS

(71) Applicant: T-Mobile USA, Inc., Bellevue, WA (US)

(72) Inventor: Samir Hodroj, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 476 days.

(21) Appl. No.: 15/896,676

(22) Filed: Feb. 14, 2018

(65) Prior Publication Data

US 2019/0253893 A1    Aug. 15, 2019

(51) Int. Cl.
| | |
|---|---|
| H04W 12/08 | (2021.01) |
| H04W 48/18 | (2009.01) |
| H04W 48/16 | (2009.01) |
| H04W 12/63 | (2021.01) |
| H04W 72/08 | (2009.01) |
| H04W 4/02 | (2018.01) |

(52) U.S. Cl.
CPC .......... *H04W 12/08* (2013.01); *H04W 12/63* (2021.01); *H04W 48/16* (2013.01); *H04W 48/18* (2013.01); *H04W 4/02* (2013.01); *H04W 72/08* (2013.01)

(58) Field of Classification Search
CPC ..... H04W 12/08; H04W 48/16; H04W 48/18; H04W 4/02; H04W 72/08
See application file for complete search history.

(56) References Cited

U.S. PATENT DOCUMENTS

| | | | |
|---|---|---|---|
| 9,832,709 B2* | 11/2017 | Bergström | H04W 48/18 |
| 10,200,943 B2* | 2/2019 | Garcia Martin | H04W 48/18 |
| 2013/0070644 A1* | 3/2013 | McCann | H04W 48/16 370/255 |
| 2014/0293829 A1* | 10/2014 | Visuri | H04M 15/8351 370/254 |
| 2014/0307550 A1* | 10/2014 | Forssell | H04W 36/14 370/235 |
| 2015/0373539 A1* | 12/2015 | Dowlatkhah | H04W 48/18 726/6 |
| 2016/0309405 A1* | 10/2016 | Gupta | H04W 72/02 |
| 2017/0111792 A1* | 4/2017 | Correia Fernandes | H04W 76/12 |

(Continued)

FOREIGN PATENT DOCUMENTS

| | | | | |
|---|---|---|---|---|
| CN | 104010347 B | * | 3/2018 | |
| CN | 103945493 B | * | 9/2018 | H04W 48/14 |
| WO | WO-2015131949 A1 | * | 9/2015 | H04L 63/0272 |

*Primary Examiner* — Michael R Vaughan
(74) *Attorney, Agent, or Firm* — Han Santos, PLLC

(57) ABSTRACT

Systems and techniques for keeping a mobile device up to date with respect to dynamic information necessary to identify and access the most suitable wireless network are disclosed. Such dynamic information includes device configuration update and wireless network selection policies update. Both device configuration data update and wireless network selection policies update includes wireless local area network (WLAN) automatic access parameters. The mobile device receives wireless network selection policies update whenever the mobile device changes location. At statically determined time slots, the mobile device receives device configuration update, followed by an additional wireless network selection policies update, which includes updated WLAN automatic access parameters.

20 Claims, 7 Drawing Sheets

(56) References Cited

U.S. PATENT DOCUMENTS

| | | | |
|---|---|---|---|
| 2017/0118689 A1* | 4/2017 | Zhang | H04W 48/16 |
| 2017/0230905 A1* | 8/2017 | Pularikkal | H04W 48/14 |
| 2017/0359216 A1* | 12/2017 | Naiden | H04L 67/34 |
| 2018/0115935 A1* | 4/2018 | Targali | H04W 8/12 |
| 2018/0160256 A1* | 6/2018 | Khanduri | H04W 36/03 |
| 2018/0227738 A1* | 8/2018 | Gupta | H04W 4/80 |

* cited by examiner

UPDATING AUTOMATIC ACCESS PARAMETERS FOR WIRELESS LOCAL AREA NETWORKS

BACKGROUND

A mobile device typically can conduct its data traffic (e.g., with the Internet) through its subscription with a wireless carrier network or mobile network operator (MNO). The same mobile device may also conduct its data traffic through wireless local area networks (WLAN) through WLAN hotspots if such hotspots are available. Depending on its location, the mobile device may be in the vicinity of zero, one or multiple hotspots of various types. A hotspot can be a personal WLAN hotspot owned by the user of the mobile device, a public WLAN hotspot provided by a venue such as airport, hotel, coffee shops, etc. A WLAN hotspot may also be a WiFi® certified Passpoint™, which allows the mobile device to automatically authenticate to a WLAN without user intervention.

Passpoint™ is an industry solution to streamline network access in hotspots and eliminate the need for users to find and authenticate to WiFi networks. Authentication is performed automatically and silently by the compliant mobile device and hotspot without user actions. This enables a more cellular-like experience when connecting to WiFi networks.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to systems and techniques for keeping a mobile device up to date so it has the dynamic information necessary to identify and access the most suitable wireless network. Such dynamic information includes wireless network selection policies as well as the wireless local area network (WLAN) automatic access parameters. The mobile device receives at least some of the dynamic information at statically determined time slots (e.g., periodically). The mobile device also receives at least some of the dynamic information whenever the mobile device changes location and moves from the vicinity of one set of wireless hotspots to the vicinity of another set of wireless hotspots.

Figure 1:
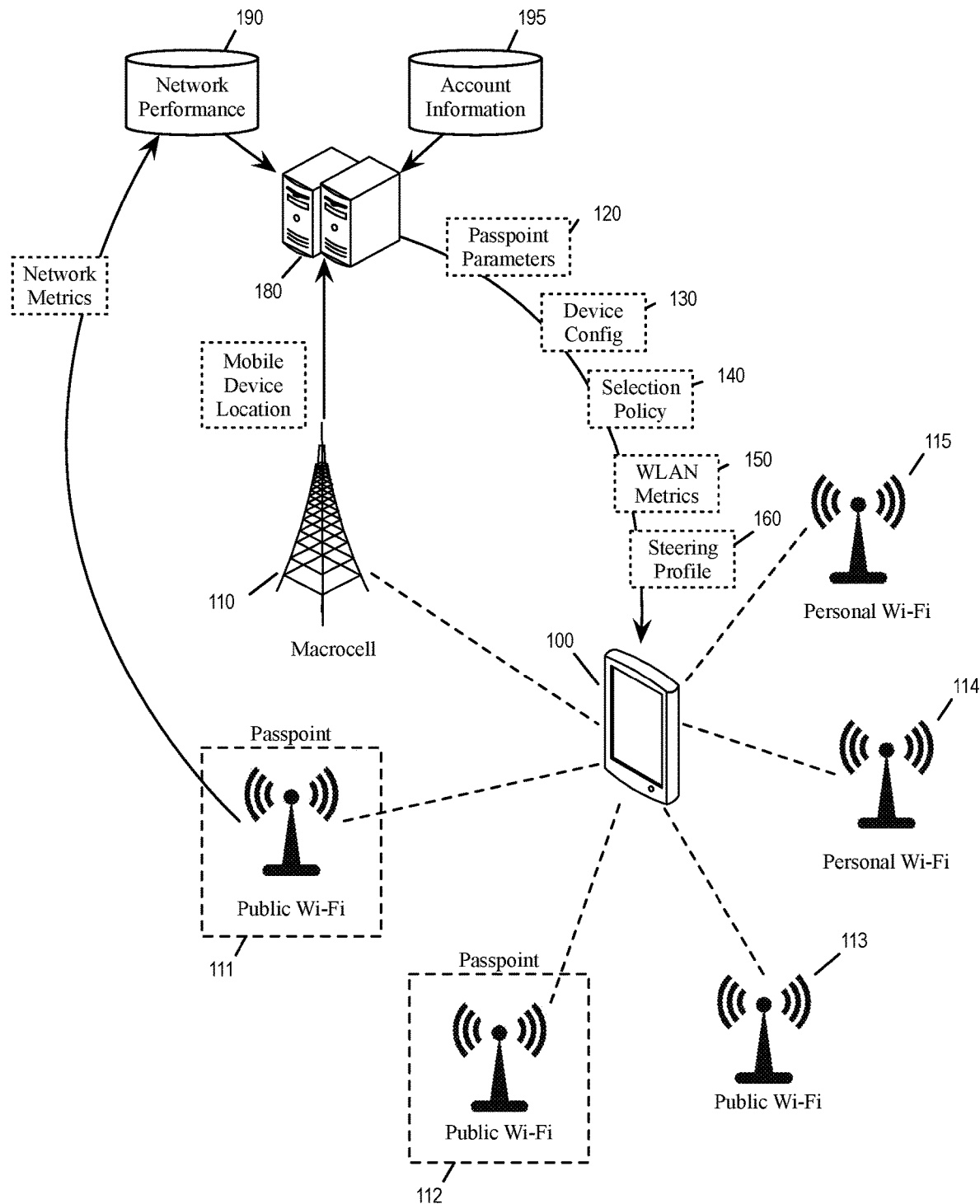
FIG. 1 conceptually illustrates a mobile device that is in the vicinity of multiple hotspots for multiple different wireless networks, consistent with an exemplary embodiment.

FIG. 1 conceptually illustrates a mobile device 100 that is in the vicinity of multiple hotspots for multiple different wireless networks, consistent with an exemplary embodiment. The figure also illustrates the delivery of dynamic information to the mobile device 100 to facilitate the selection of a most suitable wireless network hotspot for data traffic.

The mobile device 100 can be a smart phone, PDA, tablet computer, or any type of computing device capable of communicating wireless data traffic with cellular networks and wireless local area networks (WLANs or WiFi networks). The mobile device 100 may have a user account with a mobile network operator (MNO) or a wireless service provider of another type, allowing the mobile device to use publically accessible wireless networks. The mobile device may also be referred to as a user device or a user equipment (UE).

As illustrated, the mobile device 100 is in the vicinity of several wireless network signal sources 110-115. This means that the mobile device 100 is close enough in distance to these wireless network signal sources to receive signals from them and to transmit signals to them. This also means that, with the correct authentication credentials, the mobile device can access the wireless networks behind these wireless network signal sources. The access points 110-115 are specific to the current location of the mobile device 100. When the mobile device 100 moves to another location with another set of wireless network signal sources, the mobile device would receive information for using those other wireless network signal sources for data traffic.

The wireless network signal sources 110-115 includes signal sources for different types of wireless networks, including macrocells for cellular networks as well as hotspots for WLANs (i.e., WiFi networks). The wireless network signal source 110 is a macrocell of a cellular network that provides radio coverage served by a high power cell site (tower, antenna, or mast). For subscribing mobile devices, the macrocell 110 conducts cellular phone traffic as well as data traffic (including Internet traffic) through its cellular network. For the example illustrated by FIG. 1, the mobile device 100 is a subscribing device with proper credentials to conduct data traffic through the macrocell 110. Though not illustrated, the mobile device may also be within vicinity of microcells or femtocells of a cellular network.

The hotspot 111-115 are WLAN hotspots or access points. Each of these WLAN hotspots provides a wireless local area network for data traffic, which may in turn provide access to the Internet. The hotspots 111-113 are public WLAN hotspots that are usable by visitors or patrons of a venue for data traffic. Some of these public WLAN hotspots are managed hotspots that manage access to their WLANs. A managed hotspot grants access credential by methods that are open to the public, methods such payment, registration, viewing of an advertisement, or proof of a particular membership. The hotspots 114-115 are personal WLAN hotspots. They are owned by private individuals for private use. They grant access by private credentials such as passwords or device MAC addresses that are not open to the public.

Some of the hotspots 111-115 are Passpoint WiFi hotspots. (In the example illustrated in FIG. 1, the hotspots 111 and 112 are Passpoint WiFi hotspots operating Passpoint WLANs). Passpoint is an improved method for connecting to WiFi hotspots from the WiFi Alliance. Authentication is performed automatically and silently by the compliant mobile device and hotspot without user action. Access credential for a Passpoint WiFi hotspot is granted based on the mobile device account or other information that the mobile device already possesses and can be entered automatically by the mobile device without user intervention. Passpoint WiFi hotspots may also be referred to as ANDSF WiFi hotspots, since they can be selected based on policies provided by ANDSF server.

As illustrated, the mobile device receives at least these types of information: (i) Passpoint parameters 120, (ii) hotspot selection policy 140, (iii) device configuration 130, (iv) WLAN metrics 150, and (v) steering profile 160.

Passpoint parameters include information that a mobile device uses to select and access a Passpoint WLAN. Passpoint parameters 120 include beacon and access network query protocol (ANQP) parameters. These information may include venue name, domain name, network authentication type, roaming consortium list, IP address availability, Internet availability, public land mobile network (PLMN) ID list, cellular network information, channel load conditions, operating class, and operator friendly name. A mobile device capable of accessing Passpoint WiFi hotspots receives synchronous and asynchronous updates of Passpoint parameters 120. Passpoint parameters 120 provides dynamic information that the mobile device can use to find and authenticate to Passpoint WLANs that are available for the mobile device to access. The Passpoint parameters 120 may also include WLAN metrics. Passpoint parameters 120 may generally be referred to as WLAN automatic access parameters. The mobile device 100 uses these parameters to automatically authenticate to a certain class of WLAN hotspots (e.g., Passpoint WiFi hotspots) without user actions.

Hotspot selection policy 130 is delivered to the mobile device, which uses the selection policy to determine how and where to steer data traffic. The policy may determine whether to conduct data traffic through cellular networks or WLANs, or which WLAN hotspots to use, etc. The policies facilitate offloading of data traffic from cellular network to WLANs, or integration of WLAN access with cellular access to achieve the best user experience.

In some embodiments, the selection policy 130 is delivered under the ANDSF framework. The ANDSF framework may be used to deliver information such as WLAN list, location, macro network load, traffic routing, traffic aggregation, as well as any update to the selection policy.

WLAN metrics 150 includes capacity information and performance measures of the WLANs behind the Passpoint WiFi hotspots. These metrics may include link status, upload/download speed, backhaul load, IP address type, and connection capability (such as whether the ports are open or blocked). In some embodiments, the WLAN metrics 150 is delivered to the mobile device along with the Passpoint parameters 120. WLAN metrics may be available for some of the wireless networks (e.g., cellular network, public WLANs, Passpoint WLANs) but not other wireless networks (e.g., the private WLANs and some of the managed WLANs).

Device configuration 130 includes various configuration information delivered to the mobile device 100. The information may include entitlement information allowing the mobile device to access specific cellular networks or WLANs. The entitlement information may include credential for authenticating the mobile device to the cellular networks that the mobile device is a subscriber of, or for authenticating to WLANs that are in the vicinity of the mobile device. In some embodiments, device configuration 130 may be delivered together with the Passpoint parameters 120. In some embodiments, the device configuration may be written in man-machine language (MML) or extensible markup language (XML)

Steering profile 160 includes settings that control how the mobile device 100 uses the selection policy 140 to steer data traffic. Such settings may include control bits that determine whether to perform data traffic steering, whether to use the selection policy 140, whether to steer data traffic to personal hotspots (such as hotpots 114 and 115). The steering profile 160 may further include rules for selecting a wireless network based on the user account information, such as any business rules, quality of service or experience (QoS or QoE) arrangement.

The mobile device 100 receives the Passpoint parameters 120, the hotspot selection policy 140, the device configuration 130, the WLAN metrics 150, and the steering profile 160 from one or more servers 180. The servers 180 may include those operated by (1) the cellular network for which the user of the mobile device 100 is a subscriber; (2) a third-party contractor that operates the servers 180 on behalf of the wireless carrier network; or (3) another cellular network. The servers 180 may provide the information 120, 130, 140, 150, and 160 to the mobile device 100 through any wireless network (cellular networks or WLANs) that the mobile device is connected to.

The servers 180 may include servers that are located at a same or disparate geographic locations. The servers 180 may include servers that are operated by same or different vendors. In some embodiments, different servers provide different types of information to the mobile device 100. For example, the selection policy 140 may come from an ANDSF server, while the device configuration 130 and the steering profile 160 may come from a service entitlement server (SES). The mobile device 100 may also receive the same types of information from different servers. For example, the mobile device may receive two different sets of Passpoint parameters 120 from the ANDSF server and from the SES server.

The servers 180 receives and/or generates several types of data. As illustrated, the servers 180 receives network performance data 190 that are based on network metrics collected from cellular networks and wireless local area networks, including wireless networks behind hotspots 110-115. The servers 180 also collect position information of mobile devices (including the mobile device 100) that subscribes its services. The position information can include GPS information generated by mobile devices, or location of the hotspots that detect the mobile devices. The servers 180 also receive account information 195 (e.g., business information, subscription information, QoS/QoE information) regarding the mobile devices. The servers 180 use these information to generate information 120, 130, 140, 150, and 160.

EXAMPLE SERVER COMPONENTS

Figure 2:
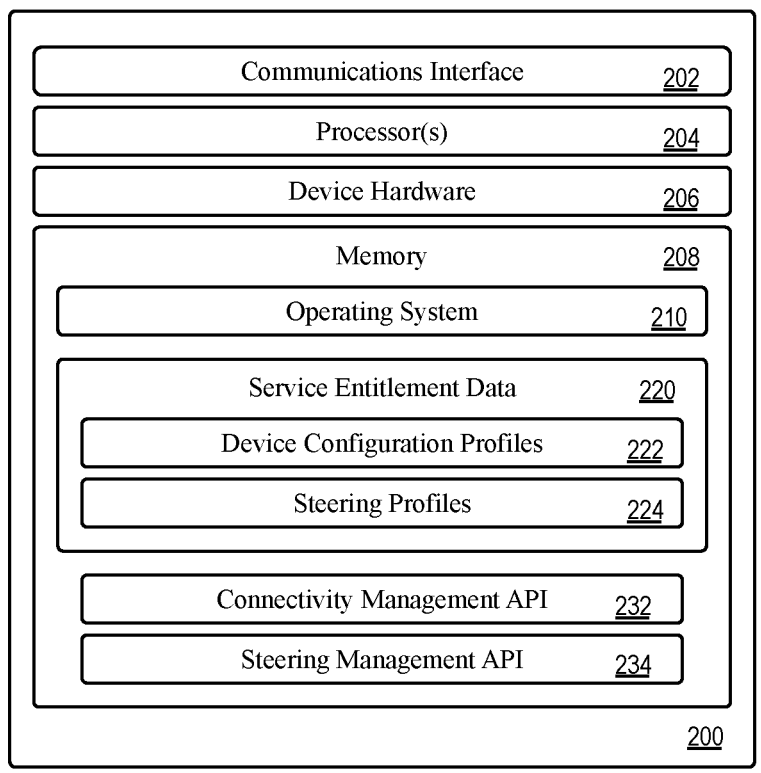
FIG. 2 is a block diagram showing various components of an example SES server, consistent with an embodiment.
Figure 2:
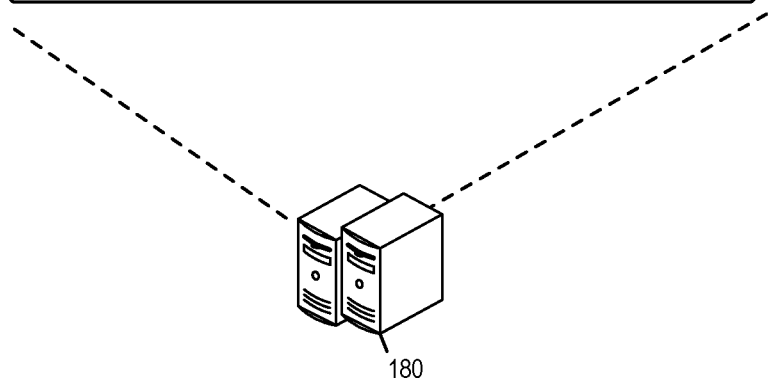

FIG. 2 is a block diagram showing various components of an example SES server, consistent with an embodiment of the disclosure. A SES server may provide steering profiles, device configuration, Passpoint parameters and other information to a mobile device or UE.

The figure illustrates a server computing device 200 implementing a SES server. The server computing device 200 is one of the servers 180. The server computing device 200 may be a general purpose computer, such as a desktop computer, tablet computer, laptop computer, server, or other electronic devices that are capable of receiving inputs, processing the inputs, and generating output data. In some embodiments, the computing devices 200 may be virtual computing devices in the form of virtual machines or software containers that are hosted in a cloud.

The computing device 200 may be equipped with a communications interface 202, one or more processors 204, device hardware 206, and memory 208. The communications interface 202 may include wireless and/or wired communication components that enable the computing devices to transmit data to and receive data from other devices, whether through a dedicated wired connection or via a communications network. The device hardware 206 may include additional hardware that performs user interface, data display, data communication, data storage, and/or other server functions.

The memory 208 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 208 of the computing devices 200 may implement an operating system 210, a set of service entitlement data 220, connectivity management application program interface (API) 232 and steering management API 234. The operating system 210 may include components that enable the computing devices 200 to receive and transmit data via various interfaces (e.g., user controls, communications interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The service entitlement data 220 may include device configuration profiles 222 and steering profiles 224 for subscribing mobile devices (including the mobile device 100.) The server computing device 200 uses the connectivity management API 232 to send device configuration data (e.g., 130) to the subscribing mobile devices. The server computing device 200 uses the steering management API 234 to send network selection policies (e.g., 140), Passpoint parameters (e.g., 120), WLAN metrics (e.g., 150), and/or steering profiles (e.g., 160), to subscribing mobile devices.

EXAMPLE USER DEVICE DOMPONENTS

Figure 3:
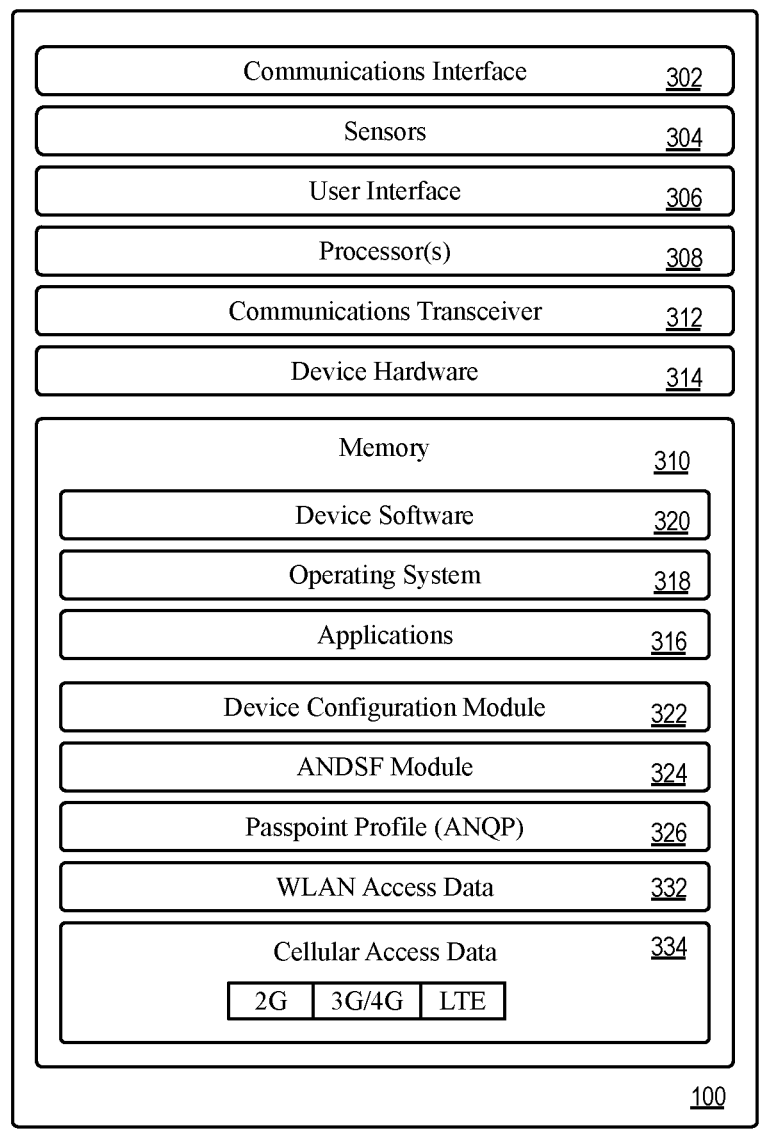
FIG. 3 is a block diagram showing various components of the mobile device, consistent with an embodiment.

FIG. 3 is a block diagram showing various components of the mobile device 100, consistent with an exemplary embodiment. The mobile device is configured to steer data traffic according to received hotspots selection policies, Passpoint parameters, and other information.

The mobile device 100 (or UE, or user device) may include a communications interface 302, one or more sensors 304, a user interface 306, one or more processors 308, and memory 310. The communications interface 302 may include wireless and/or wired communication components that enable the electronic device to transmit or receive voice or data communication over cellular networks and/or WiFi networks.

The sensors 304 may include a proximity sensor, a compass, an accelerometer, altimeter, cameras, and/or a global positioning system (GPS) sensor. The proximity sensor may detect movement of objects that are proximate the user device 104. The compass, the accelerometer, and the GPS sensor may detect orientation, movement, and geolocation of the user device 100.

The user interface 306 may enable a user to provide inputs and receive outputs from the user device 100. The user interface 306 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 310 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The user device 100 may also include communication transceivers 312 and other device hardware 314. The communication transceivers are hardware components that enable the user device 100 to perform telecommunication and data communication with the multiple communications network, such as wireless networks behind hotspots 111-115. The device hardware 314 may include other hardware that is typically located in a mobile telecommunication device. For example, the device hardware 314 may include signal converters, transceivers, antennas, hardware decoders and encoders, graphic processors, a SIM card slot, and/or the like that enable the user device 100 to execute applications and provide telecommunication and data communication functions. An integrated circuit chip such as a SIM may be inserted into the SIM card slot of the user device 100. Alternatively an embedded SIM that is hardwired into the circuit board of the user device 100.

The one or more processors 308 and the memory 310 of the user device 100 may implement an operating system 318, device software 320, one or more applications 316, a device configuration module 322, an ANDSF module 324.

The memory 310 also stores Passpoint profile 326, WiFi access data 332, and cellular access data 334.

The various software and applications may include routines, program instructions, objects, and/or data structures that perform particular tasks or implement particular abstract data types. The operating system 318 may include components that enable the user device 100 to receive and transmit data via various interfaces (e.g., user controls, communications interface 302, and/or memory input/output devices). The operating system 318 may also process data using the one or more processors 308 to generate outputs based on inputs that are received via the user interface 206. For example, the operating system 318 may provide an execution environment for the execution of the applications 316. The operating system 318 may include a presentation component that presents the output (e.g., display the data on an electronic display, store the data in memory, transmit the data to another electronic device, etc.).

The operating system 318 may include an interface layer that enables applications to interface with the communication transceivers 312 and/or the communications interface 302. The interface layer may comprise public APIs, private APIs, or a combination of both public APIs and private APIs. Additionally, the operating system 318 may include other components that perform various other functions generally associated with an operating system.

The device software 320 may include software components that enable the user device to perform functions. For example, the device software 320 may include basic input/output system (BIOS), Boot ROM, or a bootloader that boots up the user device 100 and executes the operating system 318 following power up of the device.

The applications 316 may include applications that provide utility, entertainment, and/or productivity functionalities to a user of the user device 100. The applications 316 may further include electronic mail applications, remote desktop applications, web browser applications, navigation applications, office productivity applications, multimedia streaming applications, and/or so forth.

The device configuration module 322 and the ANDSF module 324 receives data related to data traffic steering from the servers 180. The operating system 318 in turn implements data traffic steering by using the Passpoint profile 326, the WLAN access data 332, and the cellular access data 334 stored in the memory 310.

Figure 4:
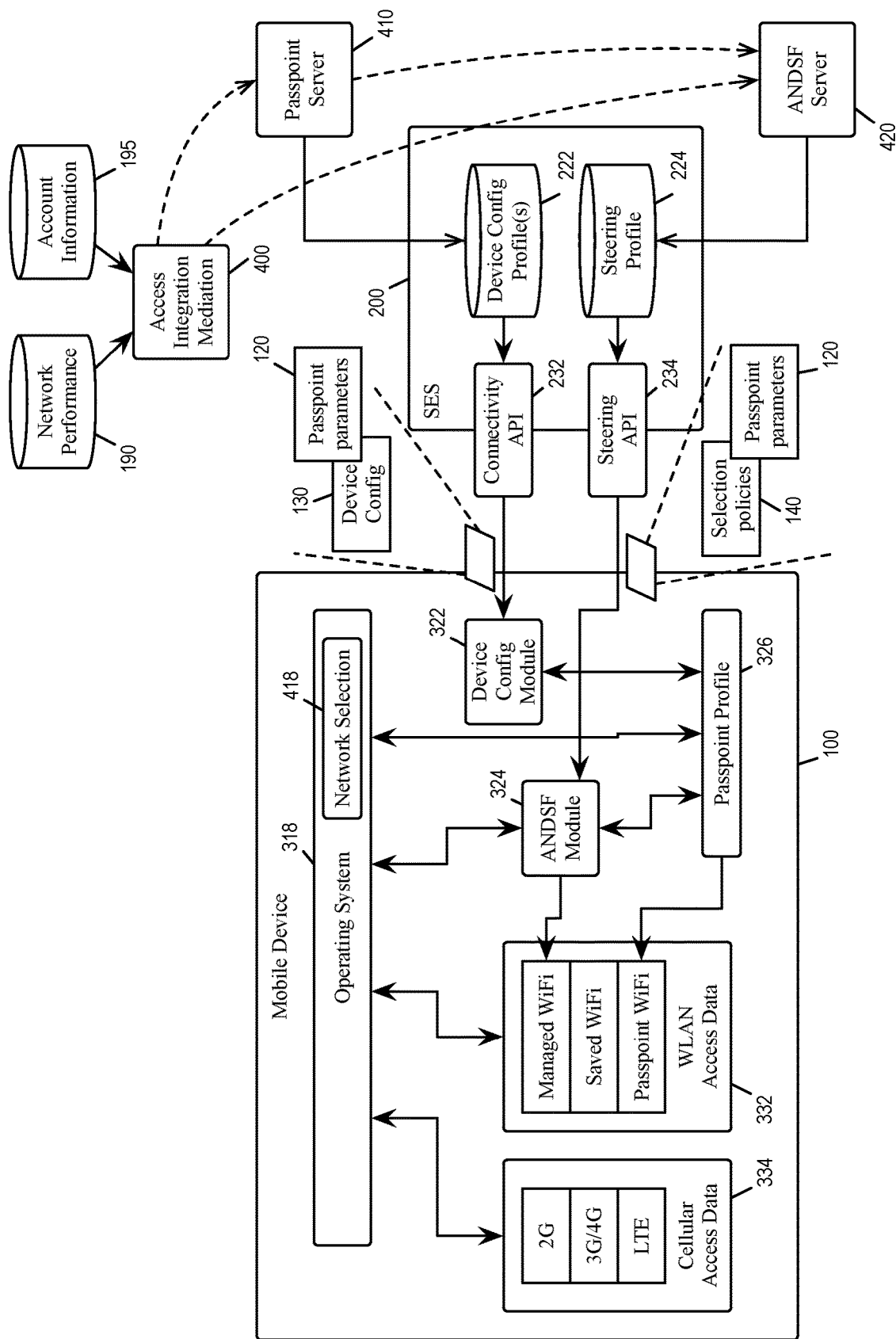
FIG. 4 illustrates flow of data related to data traffic steering between the mobile device and the server computing device.

FIG. 4 illustrates flow of data related to data traffic steering between the mobile device 100 and the server computing device 200. As illustrated, an access integration and mediation server 400 receives the network performance data 190 and the account information 195. The network performance data 190 includes network performance metrics reported by various Passpoint wireless networks. Based on the received data, the access integration and mediation server 400 performs mediation and defines a desired quality of experience or quality of service. A Passpoint server 410 and an ANDSF server 420 receives information generated by the access integration mediation server 400. The Passpoint server 410 generates Passpoint information for accessing Passpoint WLAN service providers. The ANDSF server 420 generates subscription-specific QoE/QoS derived rules and policies.

The SES server 200 generates device configuration data for mobile devices. These information are stored in the device configuration profile 222 at the SES server 222. In some embodiments, the SES maintains device configuration data on a per-device basis and the device configuration update is unique to the mobile device. In some embodiments, the SES maintains device configuration data on a per-device-group basis and the device configuration update is not unique to the mobile device but instead shared by other mobile devices belonging to the same group.

The SES 200 also receives the subscription-specific QoE/QoS derived rules and policies from the ANDSF server 420 and stores the received information as steering profile 224. The SES server 200 may also receive Passpoint information generated by the Passpoint server 410. The received Passpoint information is stored as part of the device configuration profiles 222.

The ANDSF server 420 may receive Passpoint information from the Passpoint server 410 or generate Passpoint information on its own based on information received from the Access Integration Mediation server 400. The SES 200 receives the Passpoint information from the ANDSF server 420 and store the received Passpoint information as part of the steering profile 224.

The SES 200 transmits the corresponding device configuration profile from the device configuration profiles 222 to the mobile device 100 by using the connectivity management API 232. The SES 200 also transmits the corresponding steering profile from the steering profiles 224 to the mobile device 100 by using the steering management API 234. In some embodiments, the SES 200 determines the content of the steering profile 224 and device configuration profile 222 being transmitted based on the geographic position of the mobile device and the account information associated with the mobile device.

The mobile device 100 receives the device configuration profile, which includes device configuration data 130. The received device configuration data 130 is processed by the device configuration module 322. The received device configuration profile may also include the Passpoint parameters 120. The device configuration module 322 passes the Passpoint parameters to the Passpoint profile module 326.

The mobile device 100 also receives the steering profile 224, which include hotspots selection policies 140. The received hotspots selection policies 140 is processed by the ANDSF module 324. The received steering profile 224 may also include the Passpoint parameters 120. The ANDSF module 324 passes the Passpoint parameters to the Passpoint profile module 326.

Both the ANDSF module 324 and the Passpoint profile module 326 also extracts data for accessing WLAN hotspots (passwords, wireless network identifiers, and other types of credentials) from the received steering profile and device configuration profile. The extracted data for accessing WLANs are stored as WLAN access data 332 for accessing different types of WLANs (managed WiFi, saved WiFi, and Passpoint WiFi).

The operating system 318 performs network selection function 418, which uses the ANDSF module 324 and the Passpoint profile 326 to steer data traffic. Specifically, the ANDSF module 324 provides hotspot selection policies to the operating system 318, and the operating system 318 in turn select a wireless network, whether cellular or WLAN, based on the provided hotspot selection policies. For the selected wireless network, the operating system 318 uses the data from the Passpoint profile 326, WLAN access data 332, and/or the Cellular Access Data 334 to generate the necessary access credential for the selected wireless network/hotspot. For example, the WLAN access data 332 may store user name and passwords for accessing personal WiFi of the user's home (saved WiFi). The WLAN access data 332 may also store payment information for managed WiFi of certain venues. The WLAN access data 332 may also store Passpoint parameters for Passpoint hotspots near the mobile device. Cellular Access data 334 may store credential for accessing 2G, 3G, 4G, or LTE networks.

Network Selection Policy Update

As discussed above, a mobile device relies on the Passpoint parameters it receives in order to access Passpoint WLANs and implement network selection policies. A mobile device may receive Passpoint parameters from the SES server as part of the device configuration data 130. The same mobile device may also receive Passpoint parameter from ANDSF server as part of the update to the network selection policy.

Typically, ANDSF server sends update to the mobile device asynchronously, for example, when the mobile device changes location from the vicinity of one set of wireless network hotspots to another set of wireless network hotspots. On the other hand, SES server sends update to the mobile device synchronously, for example, at fixed periodic intervals (e.g., once every 24 hours or another type of statically determined time slots).

While a mobile device is receiving location-based update from ANDSF server, a periodic device configuration update may also take place. It is possible that the set of Passpoint parameters from the ANDSF server may contradict the set of Passpoint parameters from periodic device configuration update. It is also possible that one of the two sets of Passpoint parameters is out of date. For example, a mobile device may receive up-to-date location-based update from ANDSF server with up-to-date Passpoint parameters, but that Passpoint parameter maybe immediately overwritten by out-of-date Passpoint parameters from periodic device configuration update.

Figure 5:
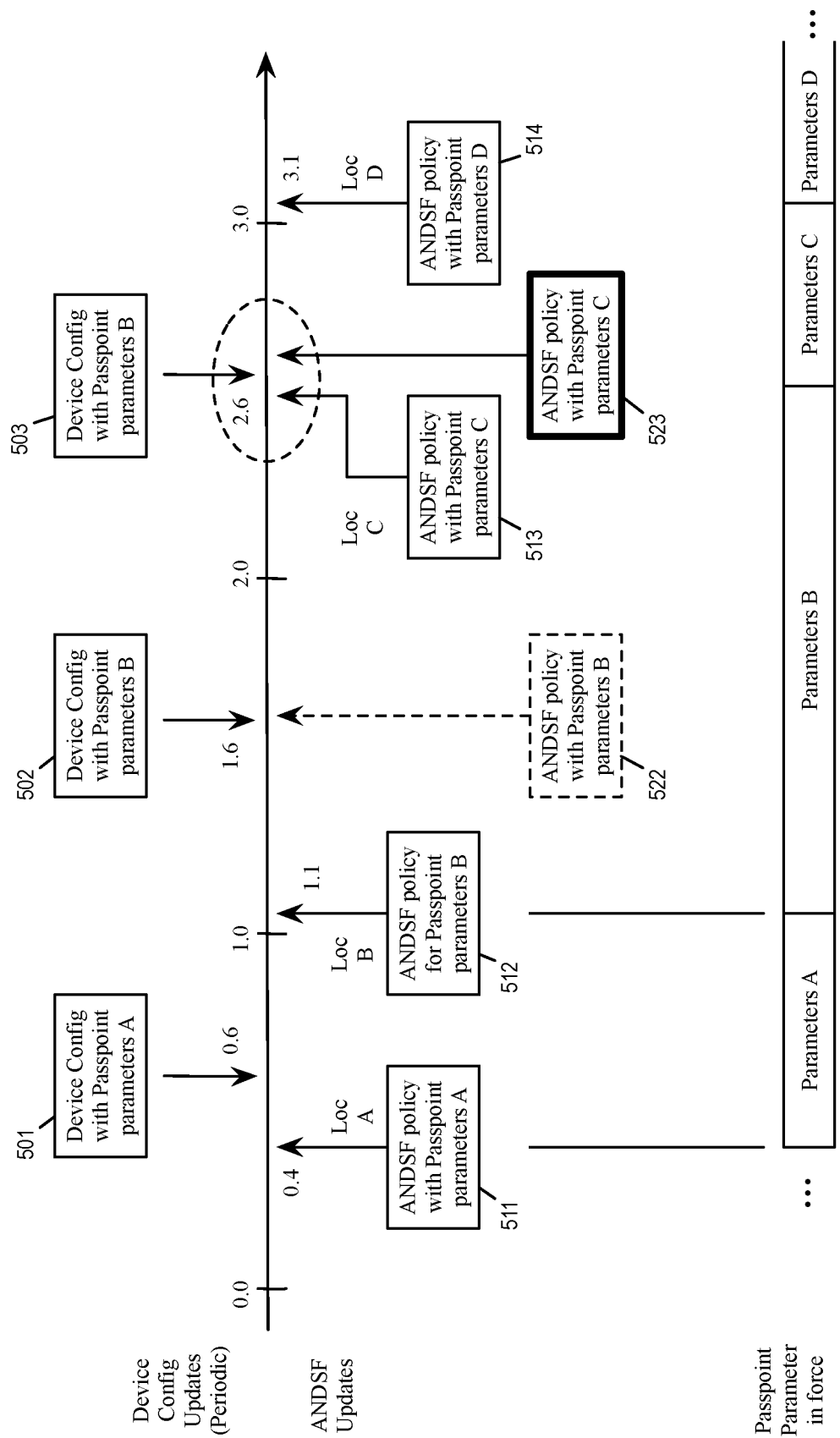
FIG. 5 conceptually illustrates update of Passpoint parameters at the mobile device, consistent with an exemplary embodiment.

FIG. 5 conceptually illustrates update of Passpoint parameters at the mobile device 100, consistent with an exemplary embodiment. As illustrated, the mobile device receives Passpoint parameters by synchronous device configuration updates 501-503 and by asynchronous ANDSF update 511-514.

The figure shows a time axis that spans from time 0.0 (e.g., start of day 0) to time 3.0 (e.g., start of day 3). The mobile device receives periodic device configuration updates 501-503 at times 0.6, 1.6, 2.6, respectively. These time slots are statically predetermined time slots at which device configuration takes place regardless of whether the mobile device changes location.

During this time span, the mobile device 100 changes location several times. The mobile device moves to location A near time 0.4, then to location B near time 1.1, then to location C near time 2.6, then to location D near time 3.1. Each change of location by the mobile device triggers a corresponding ANDSF policy update (update 511 triggered by the move to location A, update 512 triggered by the move to location B, update 513 triggered by the move to location C, and update 514 triggered by the move to location D).

Each device configuration update (updates 501-503) includes a set of Passpoint parameters. Each ANDSF policy update (updates 511-514) also includes a set of Passpoint parameters. The Passpoint parameters included in a device configuration update or an ANDSF policy update may reflect the location of the mobile device at the time of the update, for example, by including the performance metric and the authenticating information of Passpoint WLANs in the vicinity of the mobile device.

For example, the ANDSF policy update 511 occurs when the mobile device 100 moved to location A at time 0.4. Correspondingly, the ANDSF policy update 511 includes Passpoint parameters for Passpoint WLANs near location A. On the other hand, for example, the device configuration update 502 occurs near time 1.6 when the mobile device is at location B. Correspondingly, the device configuration update 502 includes Passpoint parameters for Passpoint WLANs near location B.

Since the mobile device 100 receives Passpoint parameters from both ANDSF update and device configuration update, it is possible that the Passpoint parameters from the different sources may conflict with each other, particularly when an ANDSF update occur near the same time as a device configuration update. Furthermore, in some embodiments, SES maintains device configuration data on a per-device group basis. In other words, different mobile devices belonging to a same device group may have the same Passpoint parameters even when the mobile devices have moved to different locations.

For example, as illustrated, the mobile device 100 has just moved from location B to location C near time 2.6. The device configuration update 503 of time 2.6 still includes Passpoint parameters for location B (which is obsolete for the mobile device 100). This would cause the mobile device to operate off the wrong set of Passpoint parameters. Even if the ANDSF update 513 (triggered by the move to location C) has taken place earlier, the correct set of Passpoint parameter for location C in ANDSF update 513 would have been overwritten by Passpoint parameter for location B in device configuration update 503.

In some embodiments, in order to ensure that the mobile device operate off the correct set of Passpoint parameters, each device configuration update triggers a corresponding ANDSF update. The mobile device may request this additional update from the ANDSF server each time it receives a device configuration update. The SES server may push an ANDSF update to the mobile device each time the SES server delivers a device configuration update to the mobile device.

As illustrated in FIG. 5, after the device configuration update 503 near time 2.6, the mobile device receives an additional ANDSF policy update 523. This additional ANDSF update is triggered by device configuration update 503 rather than by mobile device's change of location. The additional ANDSF update 523 includes Passpoint parameters for location C, thereby overriding the possibly obsolete Passpoint parameters in device configuration update 503.

In some embodiments, each device configuration update triggers an additional ANDSF policy update, regardless of whether the device configuration takes place near an ANDSF policy update. For example, the device configuration update 502 near time 1.6 triggers an additional ANDSF policy update 522. This occurs well after the mobile device has moved to location B near time 1.1 and the last ANDSF policy update 512 so that the Passpoint parameter in the device configuration update 502 is likely correct and unlikely to conflict with ANDSF update. In any case, the additional ANDSF update 522 ensures that the Passpoint parameter is up-to-date, regardless of whether the device configuration update occurs near a ANDSF update due to location change or not.

In some embodiments, the mobile device checks each device configuration update to see whether the device configuration data is new by e.g., checking to see if the device configuration update has the same version number as the previous device configuration update. If the device configuration data is not new (e.g., same version number), the mobile device would retain the Passpoint parameters received from the ANDSF server and not let the device configuration update write over the Passpoint parameters (e.g., in the Passpoint profile 326).

As mentioned above by reference to FIG. 4, in some embodiments, the SES is the conduit for delivering both the device configuration update and ANDSF policy update and to individual devices (through connectivity management API 232 and steering API 234, respectively). In some of these embodiments, in addition to or instead of pushing an additional ANDSF update following each device configuration update, the SES checks the Passpoint parameters in ANDSF update against Passpoint parameters in device configuration update for mismatches. If there is mismatch, the SES modifies the device configuration with the Passpoint parameters of the ANDSF update. This ensures that the set of Passpoint parameters in the device configuration data is up-to-date. In some of these embodiments, the SES maintains device configuration data on a per-device basis (rather than per-group basis) so that the Passpoint parameters included in each device configuration update can correctly reflect the location of the mobile device receiving the update.

Figure 6:
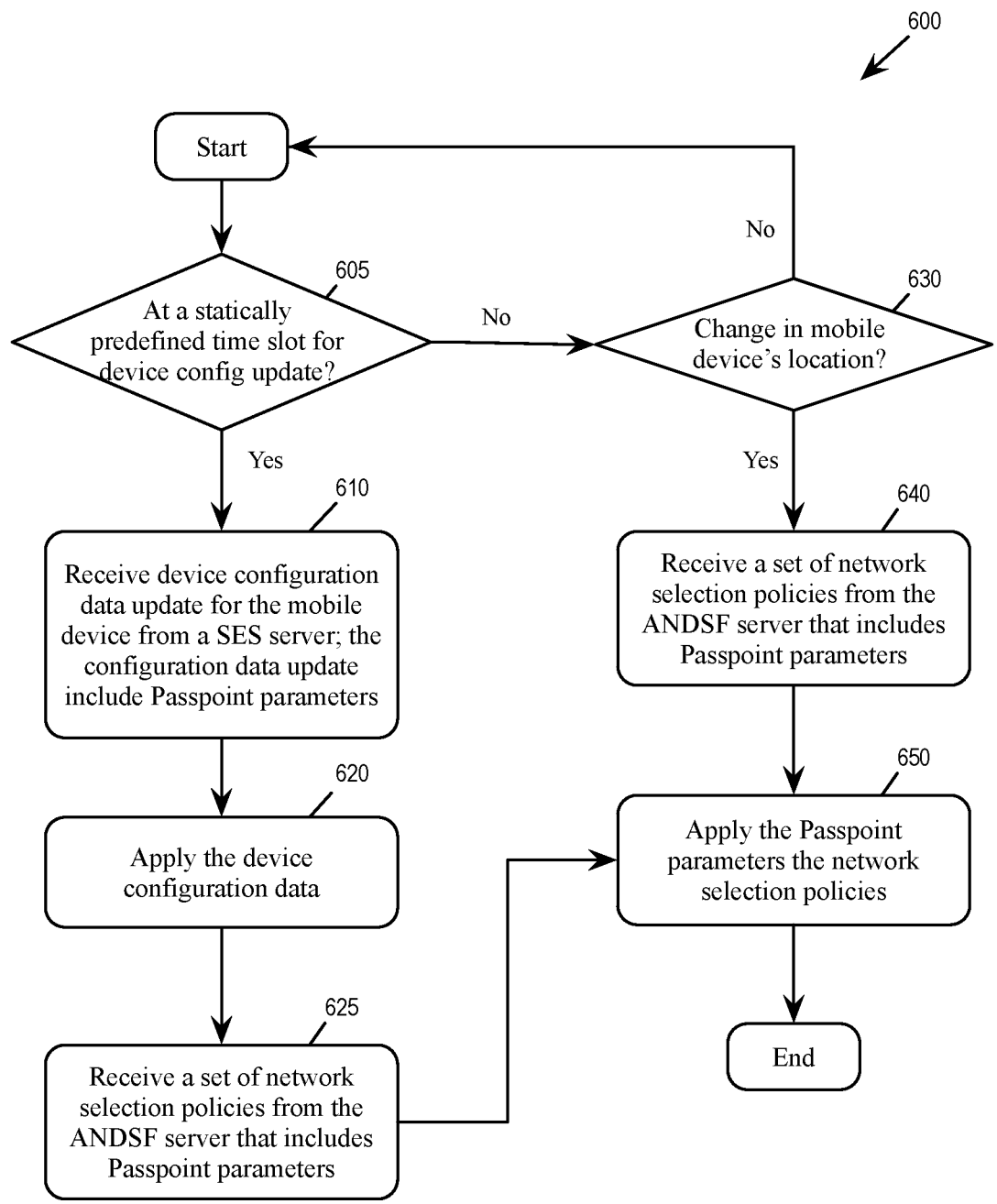
FIG. 6 conceptually illustrates an example process performed by the mobile device when receiving ANDSF update and device configuration update that include Passpoint parameters.

FIG. 6 conceptually illustrates an example process 600 performed by the mobile device 100 when receiving ANDSF update and device configuration update that include Passpoint parameters.

The process 600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process. For discussion purposes, the process 600 is described with reference to the mobile device 100 of FIG. 1.

The process 600 starts at 605. At block 605, the mobile device determines whether the current time is at a statically predefined time slots for device configuration update. In some embodiments, the mobile device receives device configuration update periodically, such as once very 24 hours. If the current time is at a statically predefined time slot for device configuration update, the process proceeds to 610. If the current time is not at such a time slot for device configuration update, the process proceeds to 630.

At block 610, the mobile device receives device configuration update for the mobile device. The device configuration update (such as 130) may include Passpoint parameters along with entitlement information allowing the mobile device to access specific cellular networks or WLANs. In some embodiments, the SES maintains device configuration data on a per-device basis and the device configuration update is unique to the mobile device. In some embodiments, the SES maintains device configuration data on a per-device-group basis and the device configuration update is not unique to the mobile device but instead shared by other mobile devices belonging to the same group. The process then proceeds to 620.

At block 620, the mobile device applies the received device configuration data. The process then proceeds to 625.

At block 625, the mobile device receives a set of network selection policies from the ANDSF server that includes Passpoint parameters. This is the additional ANDSF update that is triggered by device configuration update. This ensures that the Passpoint parameter is up-to-date, regardless of whether the device configuration update occurs near an ANDSF update due to location change or not. The process then proceeds to 650.

At block 630, the mobile device determines whether there is a change in the device's location. This determination may be based on GPS coordinate of the mobile device. This determination may also be based on the WLAN signals that the mobile device is detecting. If such a change in location is detected, the process proceeds to 640. If no change in location is detected, the process returns to the start of the process.

At 640, the mobile device receives a set of network selection policies from the ANDSF server that includes Passpoint parameters. This is the ANDSF update that is triggered by a location change of the mobile device.

At 650, the mobile device applies the Passpoint parameters and the network selection policies from the ANDSF server. The process 600 then ends (or starts again).

Figure 7:
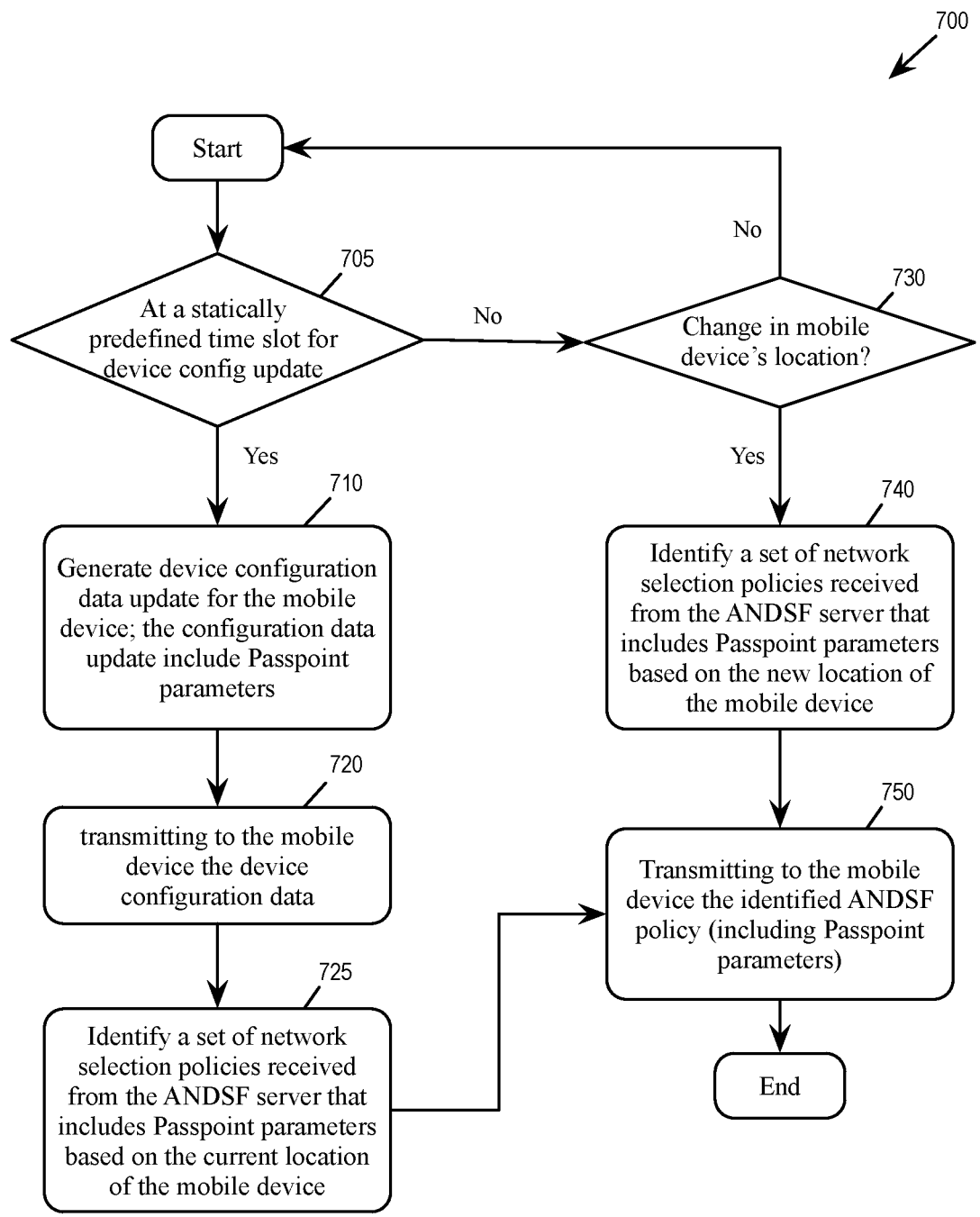
FIG. 7 conceptually illustrates an example process performed by the server computing device when transmitting ANDSF update and device configuration update to a mobile device.

FIG. 7 conceptually illustrates an example process 700 performed by the server computing device 200 when transmitting ANDSF update and device configuration update to a mobile device. The server computing device 200 may be a SES server.

The process 700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process. For discussion purposes, the process 700 is described with reference to the server computing device 200 of FIG. 2.

The process 700 starts at 705. At block 705, the server computing device determines whether the current time is at a statically predefined time slots for device configuration update for a particular mobile device. In some embodiments, device configuration update for a mobile device takes place periodically, such as once very 24 hours. If the current time is at a statically predefined time slot for device configuration update of a particular mobile device, the process proceeds to 710. If the current time is not at such a time slot, the process proceeds to 730.

At block 710, the server computing device generates a set of device configuration update for the particular mobile device. The device configuration update (such as 130) may include Passpoint parameters along with entitlement information allowing the mobile device to access specific cellular networks or WLANs. In some embodiments, the server computing device maintains device configuration data on a per-device basis and the device configuration update is unique to the mobile device. In some embodiments, the SES maintain device configuration data on a per-device-group basis and the device configuration update is not unique to the mobile device but instead shared by other mobile devices belonging to the same group. The process then proceeds to 720.

At block 720, the server computing device transmits the generated device configuration data. The process then proceeds to 725.

At block 725, the server computing device identifies a set of network selection policies from the ANDSF server that includes Passpoint parameters based on the current location of the particular mobile device. This is the additional ANDSF update that is triggered by device configuration update. This ensures that the Passpoint parameter is up-to-date, regardless of whether the device configuration update occurs near an ANDSF update due to location change or not. The process the proceeds to 750.

At block 730, the server determines whether the mobile device has changed location. This determination may be based on GPS coordinate of the mobile device. This determination may also be based on which wireless network hotspots detect the mobile device. If such a change in location is detected, the process proceeds to 740. If no change in location is detected, the process returns to the start of the process 700.

At block 740, the server computing device identifies a set of network selection policies received from the ANDSF server that includes Passpoint parameters based on the current location of the mobile device. This is the ANDSF update that is triggered by a location change of the mobile device.

At block 750, the server computing device transmits to the mobile device the identified ANDSF policy, which includes Passpoint parameters. The process then ends (or starts again).

Though not illustrated, in some embodiments, the server computing device determines whether there is a mismatch between the Passpoint parameter in the ANDSF policy and the Passpoint parameters in the device configuration. If so, the server computing device modifies the device configuration data so that the Passpoint parameters of the device configuration would match the Passpoint parameters of the ANDSF policy.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable storage media of a mobile device storing computer-executable instructions that upon execution cause one or more processors to perform acts comprising:

receiving, at a statically predefined periodic time slot, a device configuration update for the mobile device from a first server that provides synchronous device configuration updates to a plurality of mobile devices, the device configuration update including a first set of wireless local area network (WLAN) automatic access parameters and a set of device configuration data that is unique to the mobile device;

in response to receiving the device configuration update from the first server that includes the first set of WLAN automatic access parameters and the set of device configuration data at the mobile device, triggering the mobile device to send a request to a second server that maintains location-based device configuration data to request set of network selection policies and a second set of WLAN automatic access parameters, wherein the second set of WLAN automatic access parameters comprises information used to authenticate the mobile device to each of a set of wireless networks;

receiving the set of network selection policies and a second set of WLAN automatic access parameters from the second server;

automatically selecting a wireless network from the set of wireless networks using the set of network selection policies; and automatically accessing the selected wireless network using the second set of WLAN automatic access parameters and the set of device configuration data.

2. The one or more non-transitory computer-readable storage media of claim 1, wherein the first set of WLAN automatic access parameters comprises protocol or authentication data for enabling the mobile device to access an additional wireless network.

3. The one or more non-transitory computer-readable storage media of claim 1, wherein the set of network selection policies comprises a list of wireless access points that are identified based on a current location of the mobile device.

4. The one or more non-transitory computer readable storage media of claim 1, wherein the first server is a service entitlement server (SES).

5. The one or more non-transitory computer-readable storage media of claim 1, wherein the second set of WLAN automatic access parameters is received prior to a selection of the wireless network from the set of wireless networks.

6. The one or more non-transitory computer-readable storage media of claim 1, wherein the set of device configuration data comprises device access network query protocol (ANQP) parameters based on device configuration extensible markup language (XML) file.

7. The one or more non-transitory computer-readable storage media of claim 1, wherein the second server is an access network query protocol (ANDSF) server.

8. The one or more non-transitory computer-readable storage media of claim 1, wherein the statically predefined periodic time slot is determined without regard to a location of the mobile device.

9. The one or more non-transitory computer-readable storage media of claim 1, wherein the first and second sets of WLAN automatic access parameters are different sets of Passpoint parameters.

10. A system comprising:

one or more processors;

a computer-readable medium storing a plurality of computer-executable components that are executable by the one or more processors to perform a plurality of actions, the plurality of actions comprising:

maintaining a plurality of separate sets of device configuration data, each set of device configuration data for entitling a mobile device to access one or more wireless networks;

transmitting, at a statically predefined periodic time slot from a first server that provides synchronous device configuration updates, a device configuration update to a mobile device that includes a first set of wireless local area network (WLAN) automatic access parameters and a set of device configuration data, wherein the set of device configuration data is unique to the computing device; and in response to transmitting the device configuration update that includes the first set of WLAN automatic access parameters and the set of device configuration data to the mobile device, triggering, via the first server, a second server that maintains location-based device configuration data to transmit to the mobile device a set of network selection policies and a second set of WLAN automatic access parameters, wherein the second set of wireless local area network (WLAN) automatic access parameters comprises information used to authenticate the mobile device to each of a second set of wireless networks, wherein the mobile device (i) automatically selects a wireless network from a set of wireless networks using the set of network selection policies and (ii) automatically accesses the selected wireless network using the second set of WLAN automatic access parameters and the set of device configuration data.

11. The system of claim 10, wherein the statically predefined time periodic slot is determined without regard to a location of the mobile device.

12. The system of claim 10, wherein the first server is a service entitlement server (SES).

13. The system of claim 10, wherein the second server is an access network query protocol (ANDSF) server.

14. The system of claim 10, further comprising determining whether there is a mismatch between the first set of WLAN automatic access parameters and the second set of WLAN automatic access parameters and modifying the first set of WLAN automatic access parameters to match the second set of WLAN automatic access parameters.

15. The system of claim 10, wherein the set of network selection policies comprises a list of wireless access points that are identified based on a current location of the mobile device.

16. A computer-implemented method, comprising:
receiving, at statically predefined periodic time slot, a device configuration update at a mobile device from a first server that provides synchronous device configuration updates to a plurality of mobile devices, the device configuration update including a first set of wireless local area network (WLAN) automatic access parameters and a set of device configuration data that is unique to the mobile device;

in response to receiving the device configuration update from the first server that includes the first set of WLAN automatic access parameters and the set of device configuration data at the mobile device, triggering the mobile device to send a request to a second server that maintains location-based device configuration data to request a set of network selection policies and a second set of WLAN automatic access parameters, wherein the second set of WLAN automatic access parameters comprises information used to authenticate the mobile device to each of a set of wireless networks;

receiving the set of network selection policies and a second set of WLAN automatic access parameters from the second server;

automatically selecting a wireless network from the set of wireless networks using the set of network selection policies; and automatically accessing the selected wireless network using the second set of WLAN automatic access parameters and the set of device configuration data.

17. The computer-implemented method of claim 16, wherein the set of device configuration data comprises protocol or authentication data for enabling the mobile device to access the selected wireless network.

18. The computer-implemented method of claim 16, wherein the set of network selection policies comprises a list of wireless access points that are identified based on a current location of the mobile device.

19. The computer-implemented method of claim 16, wherein the first server is a service entitlement server (SES).

20. The computer-implemented method of claim 16, wherein the second server is an access network query protocol (ANDSF) server.

\* \* \* \* \*